Inventor
EDWARD O. COURTEMANCHE

Patented Jan. 13, 1948

2,434,350

UNITED STATES PATENT OFFICE 2,434,350

CONTROL UNIT FOR WELDERS

Edward O. Courtemanche, Roseville, Mich., assignor to Briggs Manufacturing Company, Detroit, Mich., a corporation of Michigan Application December 17, 1945, Serial No. 635,488

11 Claims. (Cl. 219—4)

This invention relates generally to welding apparatus and refers more particularly to improvements in control systems for spot welders.

One of the objects of this invention is to provide a relatively simple, compact spot welding apparatus having manually operated means selectively operable to form individual spot welds and having means for automatically repeating the welding cycle at predetermined intervals to form a succession of spot welds.

Another object of this invention is to provide welding apparatus wherein the operation of the repeat welding mechanism is initiated by holding the manually operable control in its applied position and is discontinued by merely releasing the manually operable control.

Still another object of this invention is to provide the welding apparatus with a control system which operates in response to manipulation of the manually operable member to effect the following operations in sequence: movement of the electrode of the welder into engagement with the work to be welded, closing the welding primary circuit to initiate the weld, opening the welding circuit to discontinue the weld, and subsequently retracting the electrode from the work.

A further object of this invention is to provide welding apparatus wherein the above mentioned control system controls successive welding cycles regardless of whether the individual welds are effected manually or whether a succession of welds are automatically produced by the repeat mechanism.

A still further object of this invention is to provide control mechanism comprising means for regulating the pressure exerted by the electrode on the work prior to closing the welding circuit, means for determining the duration of the weld, or in other words, the time the welding circuit is opened subsequent to closing of the latter and means for varying the forging time or the time pressure on the work is relieved after the weld is discontinued. Thus, regardless of whether the welder is operated manually to selectively produce individual spot welds or is operated automatically to produce a series of spot welds in succession, the welding cycle is accurately controlled to assure the most effective performance for the particular type of work being welded.

Still another feature of this invention is to provide the control mechanism with means for regulating the period of time between successive welds when the welder is operating on the repeat principle.

The foregoing as well as other objects will be made more apparent as this description proceeds, especially when considered in connection with the accompanying drawings, wherein.

Figure 1:
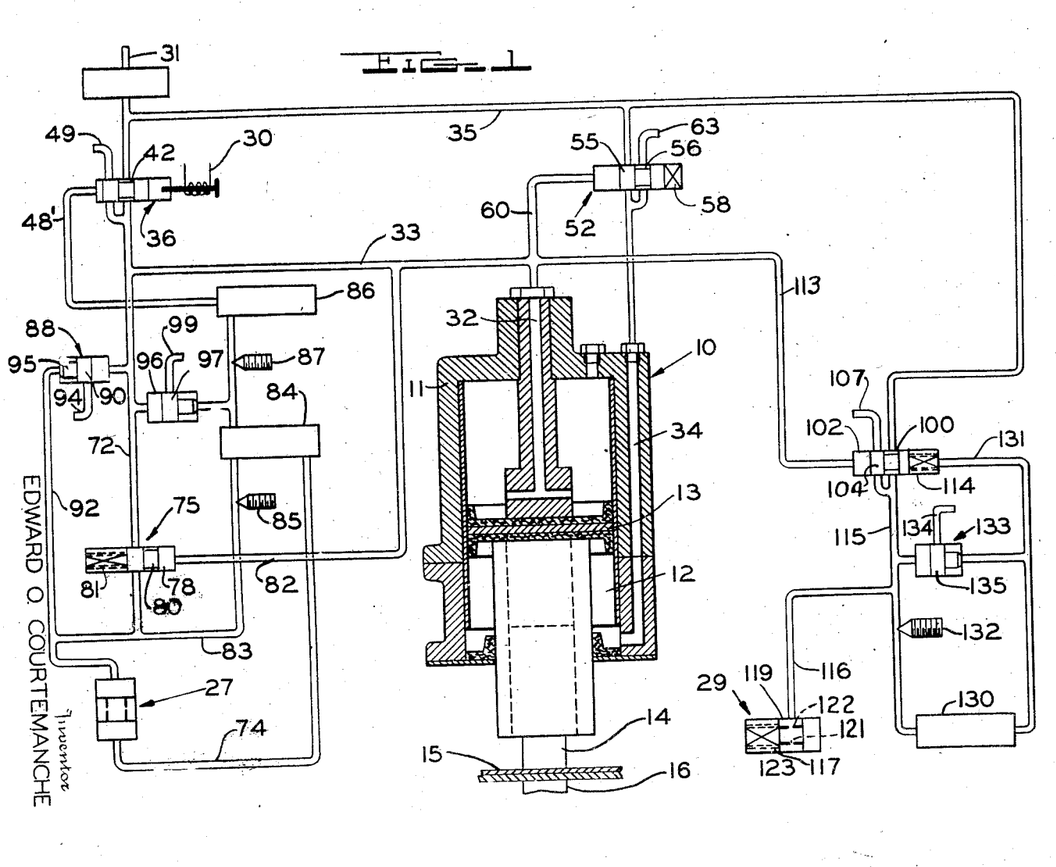
Figure 1 is a diagrammatic view showing a spot welder and the fluid pressure means for operating the welder.

Upon reference to Figure 1 of the drawings, it will be noted that the reference character 10 indicates a welding device comprising a casing 11 having a cylinder 12 and having a piston 13 slidably mounted in the cylinder 12. The piston 13 is operatively connected to an electrode 14 for moving the latter into and out of engagement with one side of the work 15 to be welded. A cooperating stationary electrode 16 is suitably supported at the opposite side of the work 15 in alignment with the electrode 14 and both electrodes are connected in series with a welding circuit indicated generally by the reference character 17.

Figure 2:
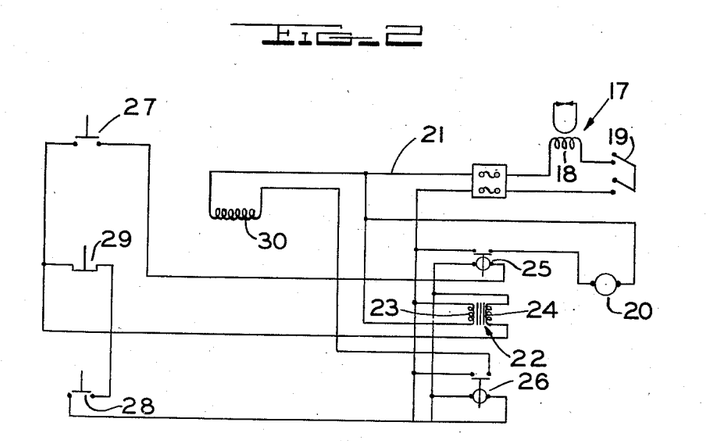
Figure 2 is an electrical diagram showing the control circuits employed in the welding apparatus.
Figure 3:
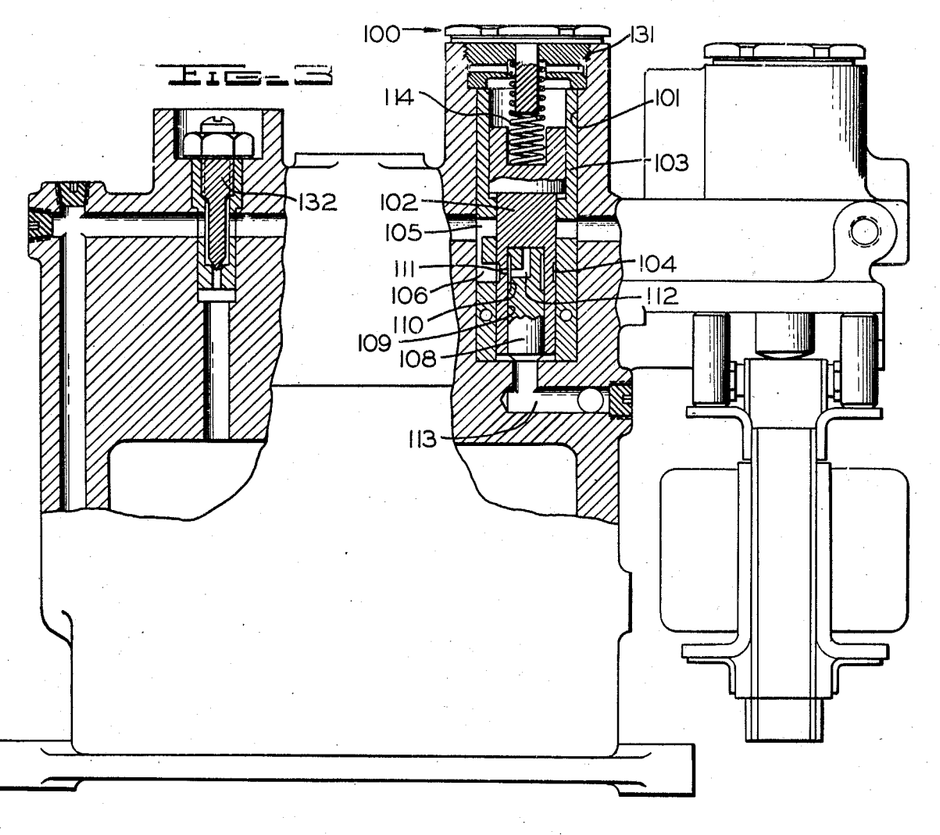
Figure 3 is a side elevational view, partly in section, of the welder control unit.
Figure 4:
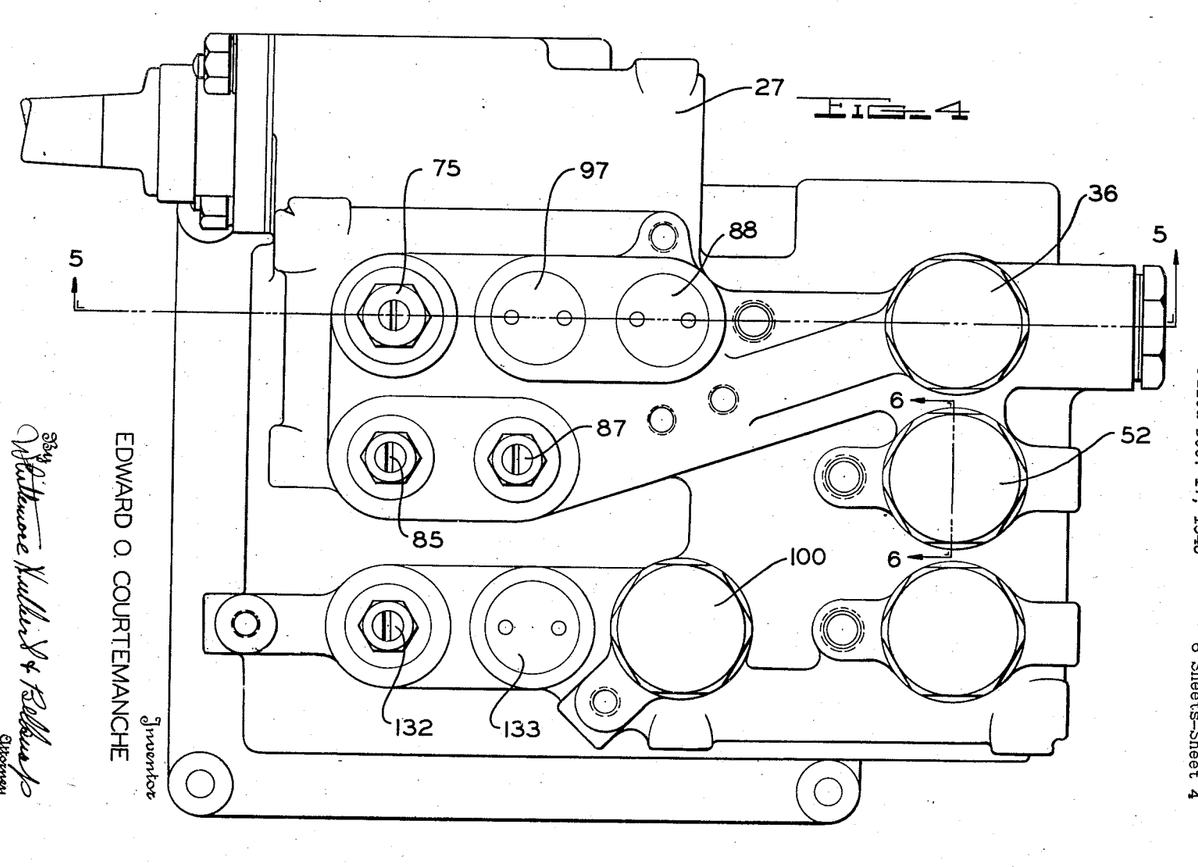
Figure 4 is a plan view of the unit shown in Figure 3.

The welding circuit includes a transformer 18 and a main switch 19 for connecting the transformer in the circuit. Upon reference to Figure 2 of the drawings, it will be noted that the switch 19 is operated by a main contactor coil 20 electrically connected in a relatively low voltage control circuit 21. The control circuit 21 includes a relatively low voltage transformer 22 having a primary coil 23 connected across the high voltage line and having a secondary coil 24 electrically connected to the relays 25 and 26. The relay 25 is operated by a pilot switch 27 connected in circuit with the contactor coil of the relay 25 and is adapted to operate through the relay 25 to energize the contactor coil 20 for closing the main switch 19 in the welding circuit 17. The switch 27 is automatically operated by fluid under pressure and will be more fully hereinafter described. The contactor coil of the relay 26 is connected in series with a pair of switches 28 and 29. The switch 28 is a manually operable switch and is positioned on the welder for convenient manipulation by the operator. The switch 29 is automatically operated by fluid under pressure and is employed in instances where it is desired to effect automatic repeat operation of the welder. The relay 26 operates a solenoid 30 through the switches 29 and 28. As will be presently described, the solenoid 30 is employed to operate the main fluid pressure supply valve for the welder control system.

Referring again to Figure 1 of the drawings, it will be noted that the portion of the cylinder 12 above the piston 13 communicates with a source of fluid under pressure 31 through the medium of a passage 32 formed in the upper end of the casing 11 and connected to the source of supply 31 by a passage 33. The portion of the cylinder 12 below the piston 13 communicates with the source of fluid supply 31 through a passage 34 formed in the casing at one side of the cylinder and through a passage 35 formed in the control unit casing 38.

A main fluid pressure control valve 36 is located between the source of fluid pressure supply 31 and the passage 32 in the welding device. This valve is shown in detail in Figure 5 of the drawings and operates on the same principle as the corresponding valve in the Henry Thomas Platz Patent No. 2,151,563, dated March 21, 1939. Briefly, the valve 36 is located in a bore 37 formed in the control unit casing 38 and comprises a valve member 39 supported in a fixed sleeve 40 for sliding movement. The valve member 39 is formed with an axially extending recess 41 and is provided with an annular groove 42 in the periphery thereof. The annular groove 42 is positioned intermediate the ends of the member 39 and is adapted to communicate with an annular groove 43 formed in the periphery of the sleeve 40 through the medium of ports 44 extending radially through the sleeve 40. Communication between the annular grooves through the ports 44 is established when the valve member 39 is moved to its innermost position shown in Figure 5 of the drawings and a spring 45 is provided in the bore 37 for resisting movement of the valve member to its innermost position. The valve member 39 is moved to its innermost position by means of a plunger 46 slidably supported in the recess 41 of the valve member and having the outer end operatively positioned with respect to the solenoid 30.

When the valve member 39 is in its innermost position, communication is established between the fluid pressure supply line 31 and the upper end of the cylinder 12 through the passages 32 and 33. As previously stated, the solenoid 30 is energized by closing the switches 28 and 29. During manual operation of the welder, the repeat switch 29 is normally closed, so that the solenoid 30 may be energized by merely momentarily closing the switch 28. Although the switch 28 is immediately opened to deenergize the solenoid 30, nevertheless, the valve member 39 is maintained in its innermost position by the action of the fluid under pressure flowing around the valve member. In this connection, attention is again directed to Figure 5 of the drawings, wherein it will be noted that when the plunger 46 has been moved by the solenoid to its innermost position, fluid under pressure is admitted to the bore 41 through the restricted ports 47. In detail, the plunger 46 is formed with an annular groove 48 in the periphery thereof and this annular groove communicates with the space in the bore 41 at the inner side of the plunger, so that when the groove 48 registers with the restricted ports 47, fluid under pressure is discharged into the bore 41. This arrangement not only maintains the valve member 39 in its operative position against the action of the spring 45, but also returns the plunger 46 to its outermost position shown in Figure 5 of the drawings.

Figure 5:
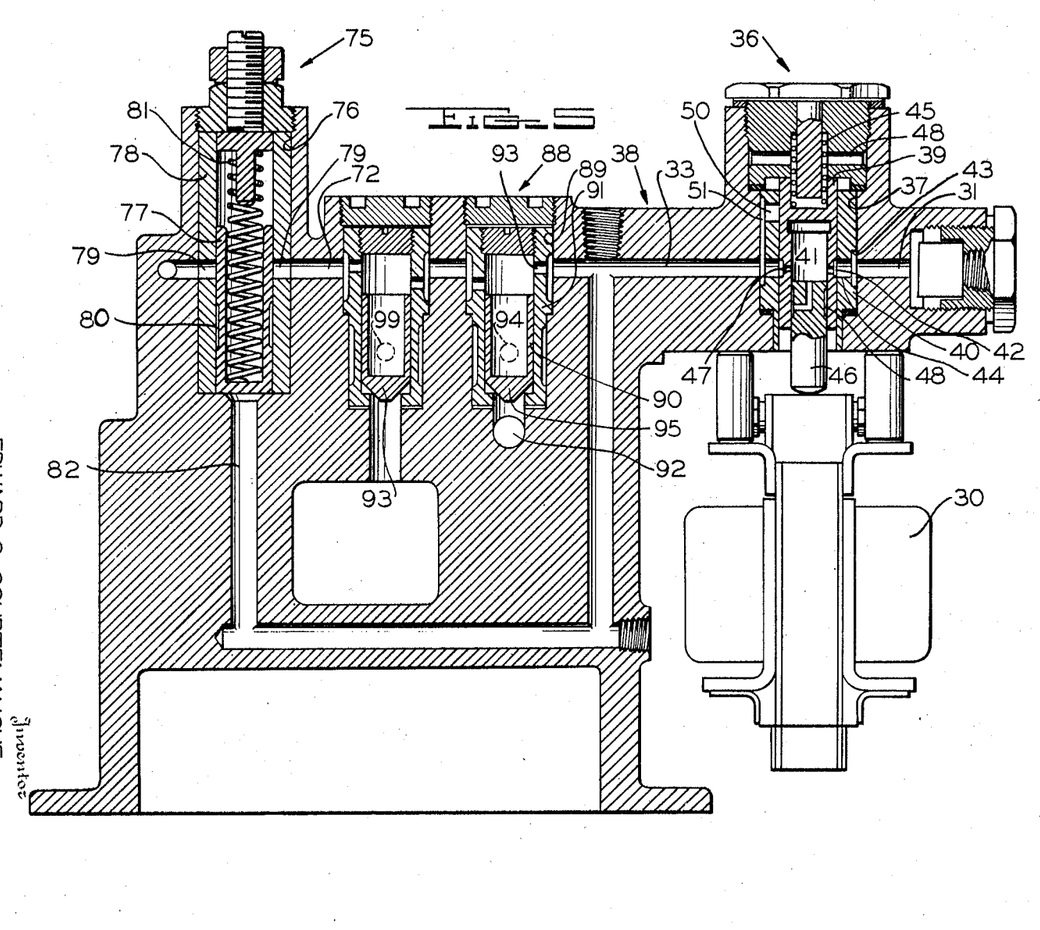
Figure 5 is a sectional view taken substantially on the line 5—5 of Figure 4.

The spring 45 is assisted in moving the valve member 39 to its outermost or inoperative position by fluid under pressure admitted to the bore 37 at the inner end of the valve member through a passage 48'. As the valve member 39 moves to its outermost position, it opens the exhaust port 49 and connects the latter to the passage 33 to exhaust fluid pressure from the upper end of the welder cylinder 12. In detail, it will be noted that the exhaust port 49 communicates with the passage 33 through the medium of a radial port 50 formed in the sleeve 40 and a longitudinally extending groove 51 extending from the port 50 to the passage 33.

Figure 6:
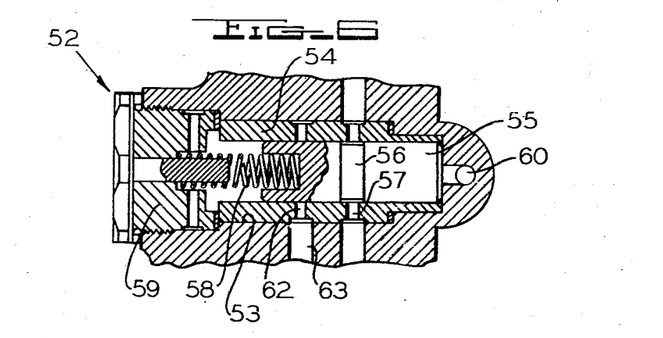
Figure 6 is a sectional view taken on the line 6—6 of Figure 4.

When fluid under pressure is introduced into the upper end of the cylinder 12, it is desired to exhaust the lower end of the cylinder 12 so as to enable movement of the piston 13 to engage the electrode 14 with the work 15. In this connection, attention is again directed to Figure 1 of the drawings, wherein it will be noted that a valve 52 is located in the passage 35 between the source of fluid pressure 31 and the passage 34. This valve is shown in Figure 6 of the drawings and is housed in a bore 53 formed in the control unit casing 38. The valve 52 comprises a sleeve 54 fixed in the bore 53 and adapted to slidably support a valve member 55. The valve member 55 is formed with an annular groove 56 in the periphery thereof adapted to register with ports 57 extending radially through the sleeve 54 when the valve member is in its innermost position shown in Figure 6 of the drawings. The ports 57 respectively communicate with the fluid pressure line 31 and with the passage 34. The valve member 55 is urged to its innermost position by means of a coil spring 58 acting on the outer end of the valve member and abutting a plug 59, which is threaded into the outer end of the bore 53. The inner end of the bore 53 communicates with a passage 60, and the latter in turn communicates with the passage 33, so that when fluid under pressure is admitted to the upper end of the cylinder 12 through the passage 33, the valve member 55 is moved outwardly against the action of the spring 58 to close communication between the lower end of the cylinder and the fluid pressure supply line 31. When the valve member 55 is in its outermost position, the annular groove 56 registers with a second series of radial ports 62 formed in the sleeve 54 in communication with an exhaust passage 63.

With the construction thus far described, it will be noted that when the operator desires to initiate a weld, the solenoid 30 is energized by closing the switch 28. The solenoid moves the valve member 39 to its innermost position wherein the exhaust passage 49 is closed and the supply line 31 is connected to the upper end of the welder cylinder 12. It will further be noted from Figure 1 of the drawings that fluid under pressure is also admitted to the inner end of the valve 52 to move the valve member 55 to a position wherein the lower end of the cylinder 12 is connected to the exhaust passage 63. As a result, the piston 13 is moved downwardly in the cylinder 12 to engage the electrode 14 with the work 15.

Figures 7, 8:
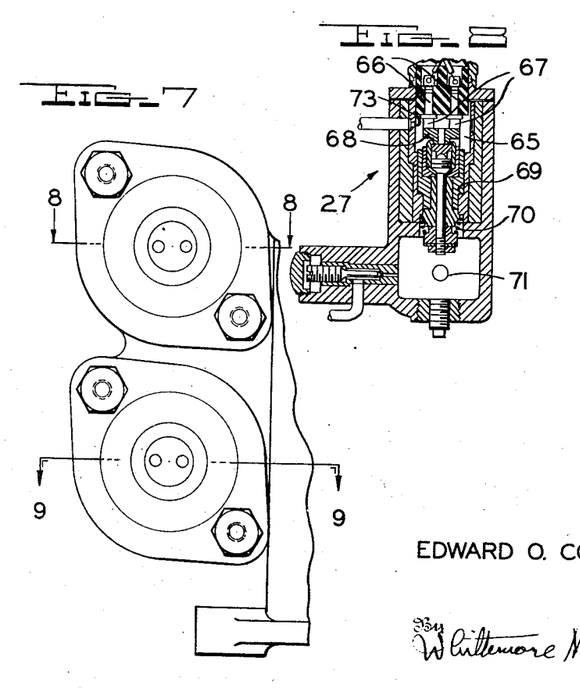
Figure 7 is a detail end elevational view of a part of the unit shown in Figure 4.
Figure 8 is a sectional view taken on the line 8—8 of Figure 7.

After the work 15 is effectively clamped between the cooperating electrodes 14 and 16, the main welding switch 19 is closed by the switch 27 to start the welding operation. The switch 27 is shown in detail in Figure 8 of the drawings and is located in a chamber 65 formed in the control unit casing 38. The switch 27 comprises a pair of stationary contacts 66 and a pair of cooperative movable contacts 67. The movable contacts 67 are secured to a head 68 and the latter is carried by a slide 69 supported in the chamber 65. The head 68 is insulated from electrical contact with the slide 69 and a spring 70 acts on the inner end of the slide in a manner to urge the contacts 67 in a direction away from the contacts 66. The chamber 65, at the inner end of the slide 69, is formed with a port 71 and the latter is connected to the passage 33 by means of a passage 72. The chamber 65 is also provided with radial ports 73 beyond the outer end of the slide 69 and the ports 73 are connected to the passage 48 by means of a passage 74.

The flow of fluid under pressure to the chamber 65 at the inner end of the slide 69 is controlled by a slide valve 75 shown in detail in Figure 5 of the drawings. The valve 75 is assembled in a bore 76 formed in the control unit housing 38 and comprises a valve member 77 which is slidably supported in a sleeve 78 fixed in the bore 76. The sleeve 78 interrupts the passage 72 and is provided with diametrically opposed ports 70 positioned in registration with the passage 72. The ports 79 are adapted to be connected to establish communication through the passage 72 by means of an annular groove 80 formed in the periphery of the valve member 77 and registerable with the ports 79. A spring 81 acts on the valve member 77 and normally urges the latter to its outermost position, wherein the ports 79 are closed by the valve member 77. The outer end of the bore 76 is connected to the passage 33 by means of a passage 82, so that when the main valve 36 is in its open position, fluid under pressure is supplied to the outer end of the bore 76. The force exerted by the spring 81 is sufficient, however, to maintain the valve 75 closed until sufficient pressure is reached in the upper end of the cylinder 12 to move the electrode 14 into clamping engagement with the work 15. When the desired clamping force is exerted on the work by the electrode 14, the force of the spring 81 is overcome by the pressure acting on the outer end of the valve member 77 and the latter is shifted to register the annular groove 80 with the ports 79 to thereby admit fluid under pressure to the switch chamber 65 through the port 71. As pressure builds up in the chamber 65 at the inner end of the slide 69, the latter is moved outwardly to engage the contacts 67 with the stationary contacts 66 to close the switch 27. Closing of the switch 27 operates the relay 25 to energize the contact coil 20 and thereby close the main switch 19 in the welding circuit 17.

Movement of the valve 75 to its open position also permits fluid under pressure to flow through the passage 83 to the accumulator chamber 84. The accumulator chamber 84 communicates with the switch chamber 65 at the outer end of the slide 69 through the passage 74. The fluid under pressure admitted to the switch chamber 65 from the accumulator chamber 84 acts on the outer end of the switch slide and tends to move the contacts 67 out of engagement with the stationary contacts 66. In this connection, it will be noted that the area of the outer end of the slide exposed to the fluid under pressure admitted to the switch from the chamber 84 is greater than the area of the fluid under pressure admitted to the inner end of the switch chamber 65 from the pressure regulator valve 75. As a result, the switch is automatically opened after a predetermined length of time to deenergize the contactor 20 and open the main switch 19 in the welding circuit. It follows from the above that the duration of the weld depends on the rate fluid under pressure is built up in the outer end of the switch chamber 65 and the present invention provides for regulating the rate of flow of fluid under pressure to the switch chamber by a needle valve 85. The needle valve is located between the accumulator chamber 84 and the inner end of the switch chamber 65 so as to control the rate of flow of fluid under pressure from the accumulator chamber 84.

The chamber 84 also communicates with a second accumulator chamber 86 and the latter communicates with the inner end of the valve 36 through the passage 48. The fluid under pressure admitted to the inner end of the valve 36 from the accumulator chamber 86 acts on the valve member 39 and tends to assist the spring 45 in shifting the valve member 39 to close the fluid pressure supply line 31. Movement of the valve member 39 to its outermost position wherein the fluid pressure supply line 31 is closed, connects the exhaust passage 49 to the passage 48. The rate at which fluid under pressure is built up in the outer end of the valve 36 to effect the above movement of the valve member 39 is controlled by a needle valve 87 located in the passage 83 between the chambers 84 and 86. The needle valve 87 is adjustable independently of the needle valve 85 and predetermined the rate of pressure rise in the chamber 86 to assure delaying the closing of the valve 36 until after the switch 27 is opened to discontinue the weld. The time period between the opening of the switch 27 and closing of the valve 36 is commonly referred to as the forging time and is regulated by the needle valve 87 to suit the particular work being welded.

It has previously been stated that when the valve 36 is closed, the passage 48 is connected to the exhaust port 49. As a result, fluid pressure is exhausted from the chamber 86, chamber 84 and switch 27. In order to facilitate exhausting the switch 27, an exhaust valve 88 is provided. As shown in Figure 5 of the drawings, the exhaust valve 88 is located in a bore 89 formed in the control unit casing 38 and comprises a valve member 90 slidably supported in a sleeve 91 which is secured in the bore 89. The outer end of the bore 89 communicates with the outer end of the switch chamber 65 through the medium of a passage 92 and the inner end of the bore communicates with the passage 72 through radial ports 93 formed in the sleeve 91. The bore also communicates intermediate its ends with an exhaust port 94 positioned to be closed by the valve member 90 when the latter is in its outermost position shown in Figures 1 and 5 of the drawings. The area of the valve member 90 exposed to the fluid under pressure admitted into the bore through the passage 72 is substantially greater than the area 95 of the valve member exposed to the passage 92. As a result, when the valve 36 is in its open position, fluid under pressure from the source 31 enters the inner end of the bore 89 and moves the valve member 90 to the position shown in Figure 1 wherein the portion 95 of the valve member closes the passage 92 and the intermediate portion of the valve member closes the exhaust port 94. However, when the valve 36 is closed or, in other words, when the exhaust port 49 is connected to the passage 72, fluid under pressure is relieved from the passage 72 and from the bore 89 of the exhaust valve. As a result, the pressure in the passage 92 acts on the reduced portion 95 of the exhaust valve to move the latter inwardly to a position wherein the exhaust port 94 is connected to the passage 92. The arrangement is such that the fluid under pressure in the switch 27 is practically instantaneously exhausted.

If desired, a similar exhaust valve 96 is provided between the passage 72 and the accumulator chambers 84 and 86. The construction of the exhaust valve 96 is identical to the exhaust valve 88 and need not be described in detail. In general, however, the reduced end of the exhaust valve member 97 closes communication between the exhaust port 99 and accumulator chambers when the valve 36 is in its open position shown in Figure 1 of the drawings. However, as soon as the valve 36 is closed to connect the exhaust port 49 to the passage 72, the pressure at the enlarged end of the valve member 97 drops, and the latter is moved to connect the exhaust port 99 to the accumulator chambers. Thus, the two exhaust valves cooperate to reduce the time required for exhausting the welder control system to a minimum.

It will be understood from the foregoing that when the valve 36 is in a position to connect the exhaust port 49 to the passage 72, the upper end of the cylinder 12 is exhausted through the passage 33. As pressure drops in the upper end of the cylinder 12, the valve 52 is opened by the spring 58 to connect the passage 34 to the source of fluid under pressure 31 and, as a result, the piston 13 is returned to its uppermost position by the pressure of the fluid acting on the bottom surface thereof.

The foregoing completes one cycle of operation of the welder and in order to initiate the next cycle of operation, the switch must be again closed to energize the solenoid 30. However, in some instances, it may be desirable to effect repeat operation of the welder, and this may be accomplished in the present instance by merely holding the manually operable switch 28 in its closed position. In detail, the repeat mechanism embodies a valve 100 assembled in a bore 101 formed in the control unit casing 38 and comprising a valve member 102 slidably supported in a sleeve 103 fixed in the bore 101. The valve member 102 has an annular groove 104 formed in the periphery thereof and adapted to alternatively register with ports 105 and 106 formed in the sleeve 103. The ports 105 are registerable with the fluid pressure supply passage 35 and the port 106 is connected to an exhaust passage 107. A plunger 108 is slidably supported in a recess 109 formed in the outer end of the valve member 102 and an annular groove 110 is formed in the periphery of the plunger. The annular groove 104 communicates with the annular groove 110 through a restricted port 111 and also communicates with the recess at the inner end of the plunger through a passage 112. The outer end of the bore 101 communicates with the passage 33 by means of a passage 113 and a spring 114 normally urges the valve member 102 to a position wherein the valve member 102 closes the passage 113.

In the closed position of the valve member 102, the ports 105 are also closed and the exhaust port 107 is opened. However, when the valve 36 is opened to supply fluid under pressure to the passage 33, the valve member 102 is moved against the action of the spring 114 by the plunger 108 to the position shown in Figure 1 of the drawings, wherein the annular groove 104 communicates with the ports 105 and connects the passage 35 to a passage 115. The fluid under pressure entering the groove 104 is conducted to the recess 109 at the inner end of the plunger through the passage 112, so that the pressure acting on the base of the recess counteracts the spring 114 and holds the valve member 102 in its open position.

The passage 115 is connected to the repeat switch 29 by a passage 116 and the fluid under pressure delivered to the switch 29 opens the latter. Inasmuch as the switch 29 is connected in series with the switch 28 and with the solenoid 30, it follows that the movement of the switch 29 to its open position deenergizes the solenoid 30 even though the operator maintains the switch 28 closed.

Figure 9:
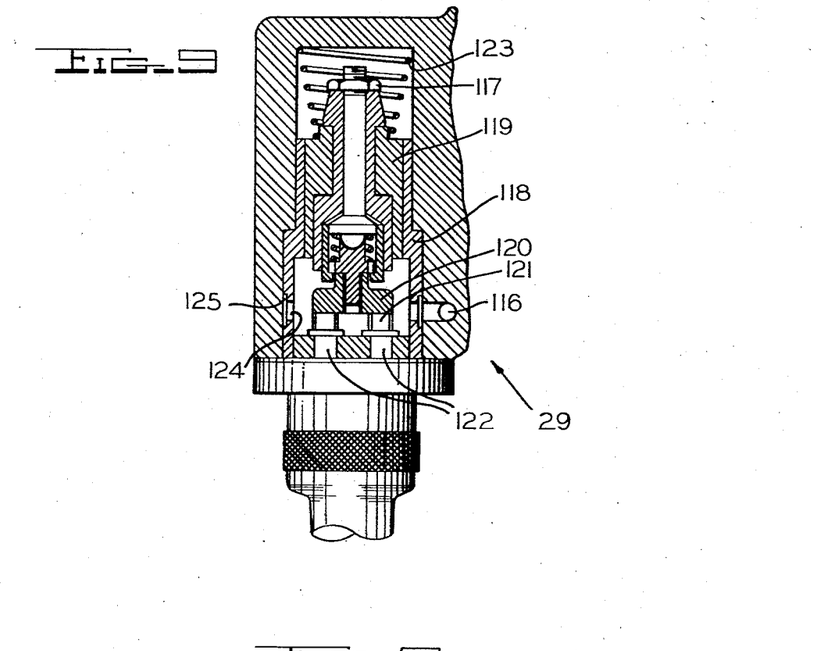
Figure 9 is a sectional view taken on the line 9—9 of Figure 7.

The switch 29 is shown in detail in Figure 9 of the drawings and comprises a chamber 117 formed in the casting 38 of the control unit and lined with a suitable sleeve 118. A slide 119 is supported in the sleeve 118 and a contactor 120 is carried by the slide. The contactor has a pair of contacts 121 secured to the outer end thereof for cooperation with a pair of stationary contacts 122 to close the circuit to the solenoid 30. The movable contacts 121 are yieldably urged into engagement with the fixed contacts 122 by means of a spring 123 acting on the inner end of the slide 119. The switch chamber 117 communicates with the passage 116 at the outer end of the slide through a plurality of ports 124 formed in the sleeve 118 and communicating with the passage 116 through an annular groove 125 formed in the periphery of the sleeve in registration with the ports 124.

It follows from the above that when sufficient pressure is built up in the valve 100 to overcome the action of the spring 114, the valve member 102 connects the outer end of the switch chamber 117 to the source of fluid under pressure 31. As soon as the pressure in the switch chamber overcomes the action of the spring 123, the contacts 121 are disengaged from the contacts 122 to open the circuit to the solenoid 30. At the termination of the welding cycle previously described in detail, the fluid under pressure at the outer end of the valve member 102 drops and the spring 114 moves the valve member 102 to its off position wherein the exhaust port 107 is connected to the passages 115 and 116. As a result, the fluid pressure in the repeat switch 29 drops and the spring 123 closes the switch 29. Thus, if the operator maintains the manually operable switch 28 closed, the solenoid 30 is again energized to open the control valve 36 to start another welding cycle.

After the welding cycle has been initiated by the control valve 36, the repeat valve 100 again assumes the position shown in Figure 1 to open the repeat switch 29. As fluid under pressure flows to the switch 29 from the repeat valve 100, it also flows to an accumulator chamber 130 which is connected to the inner end of the bore 101 by a passage 131. The fluid under pressure admitted to the inner end of the bore coacts with the spring 114 to move the valve member 102 to a position wherein the fluid pressure supply line is closed and the exhaust port is connected to the repeat switch 29. As a result, the switch 29 is again opened to deenergize the solenoid 30 and thereby permit closing of the control valve 36 at the proper time. It follows from the above that the period of time between successive welding cycles is dependent upon the action of the repeat valve 100, and this time may be regulated by a needle valve 132 The needle valve is positioned between the accumulator chamber 130 and the repeat valve 100 to control the rate of pressure rise in the accumulator chamber or, in other words, to control the time required for movement of the repeat valve to its exhaust position. If desired, an exhaust valve 133 is provided to facilitate scavenging the accumulator chamber 130 and associated instrumentalities of the repeat mechanism. The valve 133 is identical in construction to the valve 88 and the exhaust port 134 is closed by the valve member 135 when fluid under pressure is admitted to the passage 115 through the repeat valve 100. However, when the pressure drops in the passage 115, the exhaust port 134 is connected to the passage 131 by the action of fluid pressure on the reduced end of the exhaust valve. Thus, the time required to exhaust the repeat mechanism between successive welds is reduced to a minimum.

It follows from the foregoing that the welding apparatus previously described may be manually operated to effect individual welds or may be automatically operated to form a succession of welds by merely holding the manually operable control or switch 28 in its closed position. It will further be noted that, regardless of whether successive welds are manually initiated or are effected by the repeat mechanism, the welding cycle is automatically controlled to assure effective operation. In addition, all of the phases of the welding cycle may be individually regulated to enable welding materials differing widely in their characteristics and having substantially different thicknesses.

What I claim as my invention is:

1. In electric welding apparatus, a source of fluid under pressure, a cylinder having a piston slidably mounted therein, an electrode movable into and out of engagement with the work by said piston, a valve between the source and cylinder for controlling the flow of fluid under pressure to the cylinder, an electric circuit including a solenoid for opening said valve to establish communication between the source and cylinder, a manually operable switch in said circuit, a repeat switch connected in the circuit in series with the manually operable switch and also connected to the source of fluid pressure in advance of the control valve, and a repeat valve located in the fluid connection between the source and repeat switch and having a valve member operated by fluid under pressure under control of said control valve.

2. In electric welding apparatus, a source of fluid under pressure, a cylinder having a piston slidably mounted therein, an electrode movable into and out of engagement with the work by said piston, a valve between the source and cylinder for controlling the flow of fluid under pressure to the cylinder, an electric circuit including a solenoid for opening said valve to establish communication between the source and cylinder, a manually operable switch in said circuit, a repeat switch connected in the circuit in series with the manually operable switch and normally urged to its closed position, fluid pressure means for opening the repeat switch including a passage connecting the latter switch to the fluid pressure supply line in advance of the control valve, a repeat valve in said passage having a valve member normally urged to a position wherein the passage is closed and movable to open said passage by fluid pressure admitted to the cylinder by the control valve.

3. In electric welding apparatus, a source of fluid under pressure, a cylinder having a piston slidably mounted therein, an electrode movable into and out of engagement with the work by said piston, a valve between the source and cylinder for controlling the flow of fluid under pressure to the cylinder, an electric circuit including a solenoid for opening said valve to establish communication between the source and cylinder, a manually operable switch in said circuit, a repeat switch connected in the circuit in series with the manually operable switch and normally urged to its closed position, fluid pressure means for opening the repeat switch including a passage connecting the latter switch to the fluid pressure supply line in advance of the control valve, an exhaust for the repeat switch, a repeat valve in said passage between the source and repeat switch and having a valve member normally positioned to close said passage and to open the exhaust, a fluid connection between the repeat valve and delivery side of the control valve for operating the repeat valve member to open said passage and close the exhaust.

4. In electric welding apparatus, a source of fluid under pressure, a cylinder having a piston slidably mounted therein, an electrode movable into and out of engagement with the work by said piston, a valve between the source and cylinder for controlling the flow of fluid under pressure to the cylinder, an electric circuit including a solenoid for opening said valve to establish communication between the source and cylinder, a manually operable switch in said circuit, a repeat switch connected in the circuit in series with the manually operable switch and normally urged to its closed position, fluid pressure means for opening the repeat switch including a passage connecting the latter switch to the fluid pressure supply line in advance of the control valve, a repeat valve in said passage having a valve member operated by fluid pressure under the control of the control valve to open said passage and movable by fluid pressure to close said passage and exhaust said repeat switch.

5. In electric welding apparatus, a source of fluid under pressure, a cylinder having a piston slidably mounted therein, an electrode movable into and out of engagement with the work by said piston, a valve between the source and cylinder for controlling the flow of fluid under pressure to the cylinder, an electric circuit including a solenoid for opening said valve to establish communication between the source and cylinder, a manually operable switch in said circuit, a repeat switch connected in the circuit in series with the manually operable switch and normally urged to its closed position, fluid pressure means for opening the repeat switch including a passage connecting the latter switch to the fluid pressure supply line in advance of the control valve, a repeat valve in said passage having a valve member movable in one direction by fluid pressure under the control of said control valve to open said passage and movable in the opposite direction by fluid pressure to close said passage and exhaust the repeat switch, and fluid pressure regulating means for varying the time interval between movement of said member in opposite directions.

6. In electric welding apparatus, a source of fluid under pressure, a cylinder having a piston slidably mounted therein, an electrode movable into and out of engagement with the work by said piston, a valve between the source and cylinder for controlling the flow of fluid under pressure to the cylinder, an electric circuit including a solenoid for opening said valve to establish communication between the source and cylinder, a manually operable switch in said circuit, a fluid pressure operated repeat switch connected in the circuit in series with the manually operable switch, a fluid connection between the repeat switch and source at the intake side of the control valve, and means controlling the operation of the repeat switch including a valve located in said fluid connection and having a valve member operable by fluid pressure supplied under the control of said control valve.

7. In electric welding apparatus, a source of fluid under pressure, a cylinder having a piston slidably mounted therein, an electrode movable into and out of engagement with the work by said piston, a valve between the source and cylinder for controlling the flow of fluid under pressure to the cylinder, an electric circuit including a solenoid for opening said valve to establish communication between the source and cylinder, a manually operable switch in said circuit, a second switch connected in the circuit in series with the manually operable switch and operable repeatedly to open and close the circuit while the manually operable switch is held closed, and fluid pressure means for operating the repeat switch including a repeat valve operated by fluid pressure supplied under the control of said control valve.

8. In electric welding apparatus, a source of fluid under pressure, a cylinder having a piston slidably mounted therein, an electrode movable into and out of engagement with the work by said piston, a valve between the source and cylinder for controlling the flow of fluid under pressure to the cylinder, an electric circuit including a solenoid for opening said valve to establish communication between the source and cylinder, a manually operable switch in said circuit, a second switch connected in the circuit in series with the manually operable switch and operable repeatedly to open and close the circuit while the manually operable switch is held closed, fluid pressure means for operating the second switch including a passage connecting the latter switch to the source of fluid under pressure in advance of the control valve and a repeat valve in said passage between the repeat switch and control valve and having a valve member operable by fluid pressure supplied under the control of said control valve to admit fluid pressure to and exhaust the same from the second switch.

9. In electric welding apparatus, a source of fluid under pressure, a cylinder having a piston slidably mounted therein, an electrode movable into and out of engagement with the work by said piston, a valve between the source and cylinder for controlling the flow of fluid under pressure to the cylinder, an electric circuit including a solenoid for opening said valve to establish communication between the source and cylinder, a manually operable switch in said circuit, a second switch connected in the circuit in series with the manually operable switch and operable repeatedly to open and close the circuit while the manually operable switch is held closed, fluid pressure means for operating the second switch including a passage connecting the latter switch to the source of fluid under pressure in advance of the control valve and a repeat valve in the passage between the repeat switch and control valve, said repeat valve having a valve member movable to one position to connect the repeat switch to the source and movable to another position to close the latter connection and to connect the repeat switch to an exhaust, a chamber for the valve member having a fluid connection at one end of the valve member with the delivery side of the control valve closed by the valve member in the second named position thereof and having a fluid connection with the source at the opposite end of the valve member, and means for regulating the flow of fluid pressure into the chamber at the last named end of the valve member.

10. In electrical welding apparatus, a source of fluid under pressure, a cylinder having a piston slidably mounted therein, an electrode movable into and out of engagement with the work to be welded by said piston, a valve between the source and cylinder for controlling the flow of fluid under pressure to the cylinder, an electric control circuit including a switch responsive to the operation of the control valve to open and close the circuit, a fluid pressure operated repeat switch connected in the circuit in series with the switch aforesaid, a fluid connection between the repeat switch and source at the intake side of the control valve, and means controlling the operation of the repeat switch including a valve located in said fluid connection and having a valve member operable by fluid under pressure supplied under the control of said control valve.

11. In electric welding apparatus, a source of fluid under pressure, a cylinder having a piston slidably mounted therein, an electrode movable into and out of engagement with the work to be welded by said piston, a control valve between the source and cylinder for controlling the flow of fluid under pressure to the cylinder, an electric circuit including a fluid pressure operated repeat switch, a fluid connection between the repeat switch and source at the intake side of the control valve, and a repeat valve arranged in the fluid connection between the repeat switch and source and having a valve member operated by fluid under pressure supplied under the control of said control valve.

EDWARD O. COURTEMANCHE.

REFERENCES CITED

The following references are of record in the file of this patent:

UNITED STATES PATENTS

| Number | Name | Date |
| --- | --- | --- |
| 2,253,365 | Dawson | Aug. 19, 1941 |
| 2,320,655 | Pippl | June 1, 1943 |
| 2,337,019 | Ahplanalp | Dec. 21, 1943 |

FOREIGN PATENTS

| Number | Country | Date |
| --- | --- | --- |
| 540,107 | Great Britain | Oct. 6, 1941 |